United States Patent [19]

Schmid et al.

[11] Patent Number: 4,669,016
[45] Date of Patent: May 26, 1987

[54] THIN LAYERED MAGNETIC HEAD

[75] Inventors: Günter Schmid; Kurt Neuffer, both of Stuttgart, Fed. Rep. of Germany

[73] Assignee: Robert-Bosch GmbH, Stuttgart, Fed. Rep. of Germany

[21] Appl. No.: 761,108

[22] Filed: Jul. 31, 1985

[30] Foreign Application Priority Data

Aug. 4, 1984 [DE] Fed. Rep. of Germany ....... 3428800

[51] Int. Cl.[4] .......................... G11B 5/22; G11B 5/12
[52] U.S. Cl. ..................................... 360/122; 360/125
[58] Field of Search ................ 360/122, 121, 125–126, 360/129

[56] References Cited

U.S. PATENT DOCUMENTS

| 4,017,899 | 4/1977 | Bagby | 360/122 |
| 4,237,505 | 12/1980 | Yamada et al. | 360/122 |
| 4,240,121 | 12/1980 | Prochnow | 360/122 |
| 4,425,594 | 1/1984 | Kodjabashev et al. | 360/129 |

*Primary Examiner*—John H. Wolff
*Attorney, Agent, or Firm*—Michael J. Striker

[57] ABSTRACT

The magnetic head has a polished contact zone in the form of a spherical segment corresponding substantially to the arc of contact of a magnetic tape. To obtain a uniform contact pressure even after abrasion of the contact zone, the ends of the latter when viewed in the feeding direction of the tape, transit into shoulders sloping at sharp angle relative to a plane normal to the contact zone. The shoulders are either straight or of a concave contour.

8 Claims, 4 Drawing Figures

THIN LAYERED MAGNETIC HEAD

BACKGROUND OF THE INVENTION

The present invention relates to a thin layered magnetic head, particularly for use in digital sound-, video-, and data-recording on magnetic tapes. The head is of the type which includes a substrate provided on its top with a polished area facing a magnetic tape and including an arcuate contact zone extending in feeding direction of the tape to contact the latter, and a set of thin layered magnetic transducers arranged in the substrate and opening into the contact zone.

In a prior art magnetic head of this type the polished area has a uniform arcuate contour which extend in the feeding direction of the tape through the contact zone of the letter and depending on the construction type of the head, has a constant radius between 2 to 6 mm.

Since magnetic heads are subject to wear, the contact zone contacting the magnetic tape increases disproportionally to the abrasion to occupy progressively larger portion of the polished area. Consequently, after prolonged operational periods the contact surface between the head and the tape grows larger and specific contact pressure of the tape against the contact zone diminishes. This reduction of the specific contact pressure together with contamination deposits and built-up residuals as well as due to the lift of the tape caused by an air wedge, leads to stronger distance damping. This increased damping especially at very high recording densities with magnetization wavelengths between 1 to 2 microns impairs the transmission quality of the head beyond repair.

SUMMARY OF THE INVENTION

It is therefore a general object of the present invention to overcome the aforementioned disadvantages.

In particular, it is an object of this invention to provide an improved thin layered magnetic head of the aforedescribed kind where even after a strong abrasion of the contact zone caused by wear, the contact surface between the head and the tape remains substantially unchanged and within the limits of the initial contact zone.

Another object of this invention is to provide such an improved magnetic head at which the specific tape contact pressure remains substantially of the same magnitude irrespective of the increasing abrasion.

Still another object of this invention is to prevent the build up of an air wedge under the tape which in prior art magnetic heads causes the so-called "launching" of the magnetic tape leading to the reduction of the contact pressure.

Still another object of this invention is to strip off contaminating particles and fibers from the tape during its sliding on the polished surface of the head.

Furthermore, an object of this invention is to provide such an improved magnetic head which permits the control of its abrasion within desired or tolerance limits. The control of the abrasion of the magnetic head in the range of the thin layered magnetic transducers in the contact zone may under circumstances provide for a healing grinding which removes corrosive and magnetically negative points on the active surface, thus achieving an optimum transfer quality.

In keeping with these objects and with others which will become apparent hereafter, one feature of the invention resides, in a thin layered magnetic head, in a combination which comprises a supporting body formed with an arcuate contact zone extending in feeding direction of a magnetic tape to contact the latter, a separation plane bisecting the arcuate contact zone transversely to the feeding direction, and with two shoulders sloping from opposite ends of the contact zone when viewed in the feeding direction, the shoulders including sharp angles with the separation plane, a set of thin layered magnetic transducers arranged in the separation plane and opening into the contact zone, and means for guiding the magnetic tape on an arcuate path whose radius of curvature equals to or slightly exceeds that of said, arcuate contact zone.

Due to the wedge-like configuration of the substrate below the contact zone the contact area between the magnetic head and the magnetic tape remains substantially the same even at progressive wear of the head. The steep shoulders or flanks sloping from the polished surface prevent the formation of an air wedge and moreover, contribute to the removal of contaminating particles and fibers from the oncoming tape.

The entire geometry of the magnetic head according to this invention permits by suitable selection of materials of the substrate and of the covering plates the control of the wear abrasion within desired and physically tolerable limits. The controlled or predetermined abrasion of the polished substrate of the thin layered magnetic transducers in the contact zone provides for a so-called "healing grinding" which removes corrosive or magnetically negative points from the active surface.

In a preferred embodiment of this invention, the shoulders or flanks of the substrate are straight and are ground by means of a special grinding device employing a rotary disc coated with a diamond film, and a microscopic control. In another preferred embodiment of this invention the flanks or shoulders have a concave contour ground by a diamond film coated jacket of a grinding disc so that the radius of curvature of the concave shoulders corresponds to the radius of the grinding tool.

The length of the arcuate contact zone in the feeding direction of the magnetic tape corresponds to or is slightly larger than the arc of tape contact. Usually, the radius of curvature of the contact zone is about 2 mm, and the arc of tape contact amounts of 200 microns.

With advantage, the polished contact zone has also an arcuate contour transversely to the feeding direction of the magnetic tape. Accordingly, in combination with the arcuate shape in the feeding direction, the contact zone is in the form of a spherical section which guarantees an intensive mechanical contact at magnetically sensitive points of the transducers. The spherical top surface of the contact zone is produced by a band polishing process in which the guidance of the polishing band is geometrically substantially identical with the intended guidance of the actual magnetic tape.

In the case of a multi-track thin layered magnetic head constituted by a series transducers arranged transversely to the feeding direction of the tape, there are provided according to another feature of this invention, depressions or recesses between individual thin layered transducers. The resulting comb-like subdivision of the polished contact zone guarantees a high contact pressure in all magnetically sensitive points of respective transducers. Since the magnetic tape portions immerse into the recesses of the contact zone between respective transducers, the tape portions are deformed into approximately elliptical sections exerting maximum specific contact pressure approximately midway between the recesses where the magnetically sensitive points of the transducers are located. In the course of the unavoidable abrasion of the magnetically sensitive points, the immersion of the magnetic tape sections into the recesses insures that the degree of abrasion is substantially uniform also in the environment of the sensitive points. Consequently, the advantageous dome-like structure of the contact zone sectors with magnetically sensitive points at the center of the respective domes is preserved until the wear limit of the magnetic head is reached. Moreover, the recesses in the contact zone act as air ducts and air draining passages which particularly at high speeds of the magnetic tape prevent the formation of an air wedge under the latter and consequently the prior art tendency of launching or lifting of the band due to the air wedge is effectively reduced. A multi-track thin layered magnetic head of this kind is particularly suitable for high speed recording in the digital video technology and for the data processing. The slot like recesses whose depth, depending on the construction of the magnetic head amounts between 2 to 5 microns are produced by a dry etching process. In another embodiment, the recesses can be produced by a micromechanical method by means of a rotating diamond doped separation disc whose periphery is beveled at sharp angles The novel features which are considered a characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
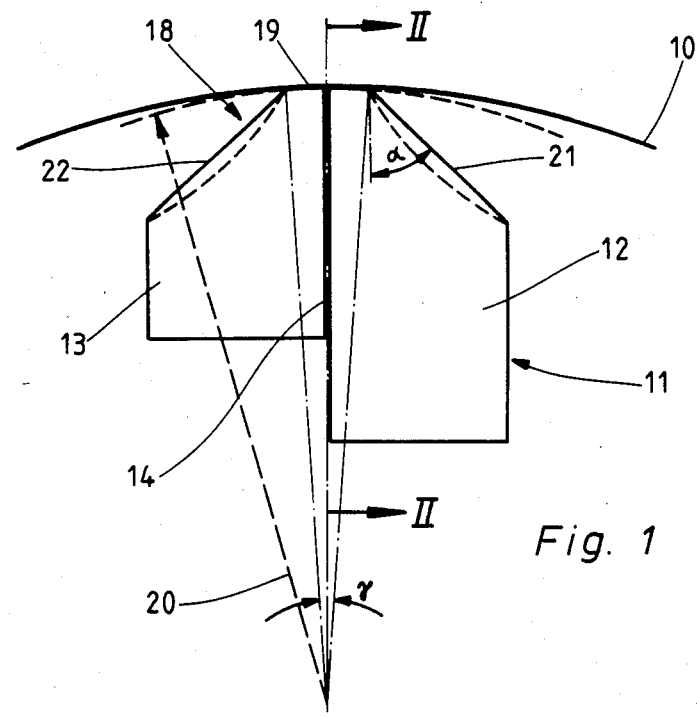
FIG. 1 is a schematic side view of a multi-track thin layered magnetic head according to this invention shown with a magnetic tape guided thereon.
Figure 2:
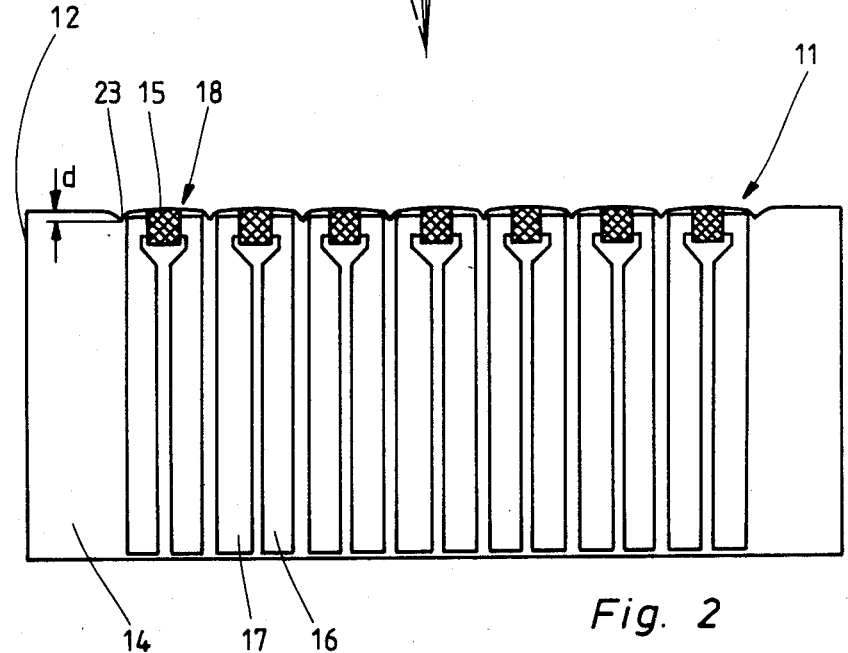
FIG. 2 is a sectional elevation view of the magnetic head of FIG. 1, taken along the line II—II.

The multi-track thin layered magnetic head 11 shown in FIGS. 1 and 2 includes a supporting body assembled of a substrate 12 partially covered at one side thereof by a cover material or cover plate 13. In the separation plane 14 between the cover plate 13 and the substrate 12 there is arranged a set of magnetic transducers 15 with corresponding leads 16 and 17 (FIG. 2) for producing discrete magnetic fields. The juxtaposed thin magnetic layers of respective transducers 15 together with their conduits 16 and 17 can be manufactured and arranged in accordance with the disclosure of the German publication DE-OS No. 32 04 184 which will be explained below with reference to FIGS. 3A and 3B. The magnetic thin layers open into an end face of the supporting body 12, 13 of the magnetic head 11 whereby the two facing magnetic thin layers are arranged one after the other in the feeding direction of a magnetic tape 10 to form a magnetically active gap 14 therebetween for recording on the tape 10.

It will be seen from FIG. 2 that the magnetic head 11 includes seven magnetic head sections 18 of the same configuration arranged side by side and forming together a recording track extending at the center of transversely to the feeding direction of the magnetic band 10 polished contact zones 19 formed at the top side of the supporting body 12, 13. Each contact zone 19 is curved in the feeding direction of the magnetic tape 10 and its radius of curvature 20 is indicated by a dashed line in FIG. 1. In an actual magnetic head of this kind the radius 20 amounts to about 2 mm. The arc formed by a portion of the tape 10 which is in contact with the arcuate zone 19 is the same or only slightly larger than the arc of the contact zone 19 corresponding to a center angle $\gamma$ of the tape contact. The center angle of the arc formed by the contacting portion of the tape 10 is determined by the spatial arrangement of non-illustrated tape guiding elements relative to the magnetic head 11 and by the radius 20 of the contact zone 19. The tape contact angle $\gamma$ thus determines together with the radius 20 the contact area between the magnetic head and the magnetic tape which, as mentioned before, corresponds to the length of the contact zone 19 (200 microns) or slightly exceeds the same (250 microns).

When viewed in the feeding direction of magnetic tape 10, then the polished contact zone 19 of each magnetic head section 18 transits into sloping shoulders 21 and 22 each including an acute angle with a plane parallel to the separation plane 14. In the example of FIG. 1, the shoulders 21 and 22 are straight. In a modification, these shoulders can also have a concave contour as indicated by dashed lines. The angle $\alpha$ of inclination of respective shoulders 21 and 22 to the parallel planes is determined in dependency on the material used for the substrate 12 and for the cover plate 13.

It will be also seen from FIG. 2, that the series of magnetic head sections 18 extending transversely to the feeding direction of the magnetic tape 10 are mutually separated by slot like recesses 23. The depth d of respective recesses 23 can be for example between 2 to 5 microns and must match the permitted abrasion limit of the magnetic head sections 18. Each magnetic head section 18 from one recess 23 to the next one has a contour of a flattened arc. Consequently, in combination with the arcuate shape of each magnetic head section 18 in the feeding direction of the magnetic tape, each magnetic head section 18 has the form of a spherical segment. The recording magnetic gaps of respective transducers 15 are located at the center of each dome-shaped section 18 and the recording gaps of the transducers are in alignment with one another transversely to the feeding direction of the magnetic tape.

Figure 3A:
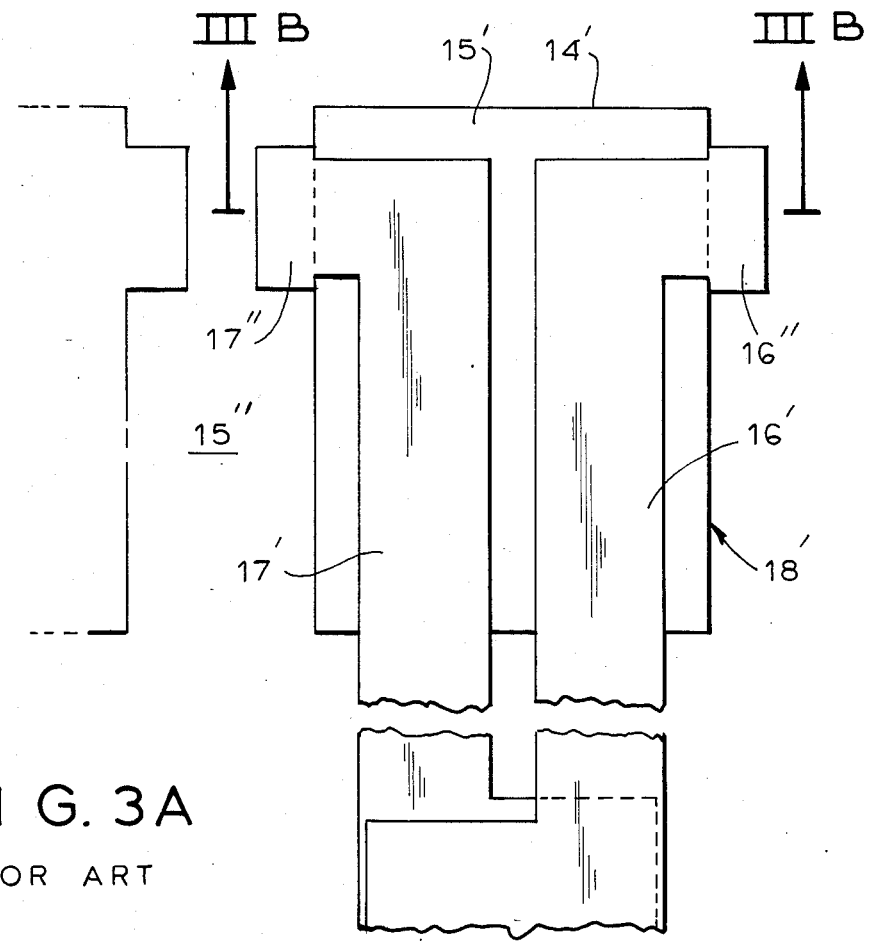
FIG. 3A is a plan view of a prior art thin-layered magnetic head of this type.
Figure 3B:
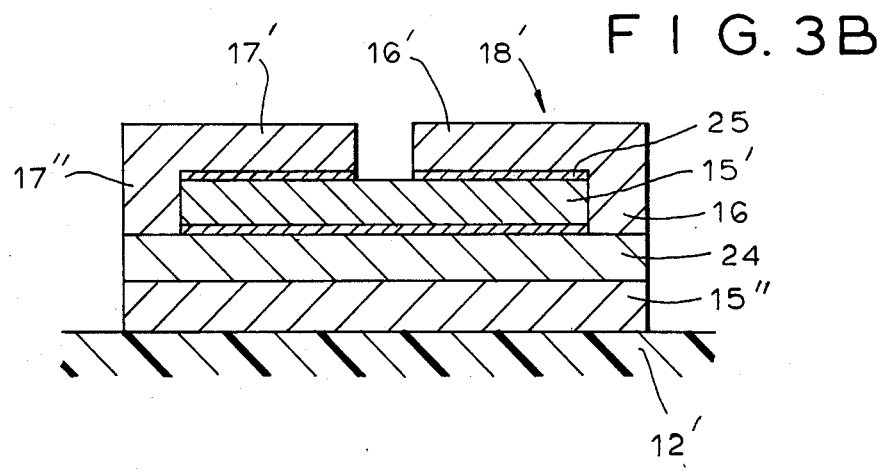
FIG. 3B is a sectional view of the head of FIG. 3A, taken along the line III—III.

Referring to FIGS. 3A and 3B illustrating an embodiment of a prior art thin-film multitrack magnetic head according to the beforementioned German DE-OS No. 32 04 184 (assigned to the same assignee as this application), each section 18' of the multitrack head includes a lower magnetic layer 15", and an upper magnetic layer 15'. In the region of the magnetizing gap 14' the two magnetic layers are separated from one another by an energizing inner conductive layer 24 connected by lateral contact straps 16' and 17" to conductive leads 16' and 17'. The upper magnetic layer 15' is insulated from the leads 16' and 17' and from the inner conductive layer 24 by a vapor deposited insulating layer 25. The lower magnetic layer 15" is supported on a lateral side of an insulating substrate 12'.

While the invention has been illustrated and described as embodied in a special example of a multi-track magnetic head, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement of a thin layered magnetic head particularly for use in digital sound-, video-, and data recording on magnetic tapes, comprising a supporting body formed with an arcuate contact zone extending in a feeding direction of a magnetic tape, a separation plane bisecting said arcuate contact zone transversely to said feeding direction, the ends of said arcuate contact zone transiting into sloping shoulders, each of said shoulders including a sharp angle with a plane parallel to said separation plane, at least one thin layered magnetic transducer arranged in said separation plane, and means for guiding said magnetic tape in said feeding direction on an arcuate path whose radius of curvature equals to or slightly exceeds that of said arcuate contact zone.

2. An arrangement as defined in claim 1, wherein said shoulders have a straight contour.

3. An arrangement as defined in claim 1, wherein said shoulders have a concave contour.

4. An arrangement as defined in claim 1, wherein in the direction transverse to the feeding direction said contact zone has a shape of flattened arc.

5. A magnetic head as defined in claim 1, wherein the angle of inclination of said shoulders depends on the abrasive properties of materials of the supporting body.

6. A thin layered magnetic head particularly for use in digital sound-, video-, and data recording on magnetic tapes, comprising a supporting body formed with an arcuate contact zone extending in a feeding direction of a magnetic tape, a separation plane bisecting said arcuate contact zone transversely to said feeding direction, the ends of said arcuate contact zone transiting into sloping shoulders, each of said shoulders including a sharp angle with a plane parallel to said separation plane, at least one thin layered magnetic transducer arranged in said separation plane, said supporting body being assembled of a substrate and of a cover adjoining one side of the substrate in said separation plane, said magnetic transducer being assembled of two juxtaposed magnetic thin layers provided with supply leads and defining a magnetically active gap therebetween, said gap opening into said contact zone and extending transversely to the feeding direction of the magnetic tape.

7. A magnetic head as defined in claim 6, comprising a plurality of thin layered magnetic transducers arranged side by side in said separation plane, magnetically active gaps of said transducers being aligned one with the other transversely to said feeding direction, and slot like recesses formed in said contact zone between respective transducers.

8. A magnetic head as defined in claim 7, wherein the section of said contact zone between respective recesses have arcuate shape in the direction transverse to the feeding direction.

* * * * *